US008782643B2

(12) United States Patent
Miyabe

(10) Patent No.: US 8,782,643 B2
(45) Date of Patent: Jul. 15, 2014

(54) DEVICE AND METHOD FOR CONTROLLING COMMUNICATION BETWEEN BIOS AND BMC

(75) Inventor: Yasuo Miyabe, Tokyo (JP)

(73) Assignee: Nec Corporation, Tokyo (JP)

( * ) Notice: Subject to any disclaimer, the term of this patent is extended or adjusted under 35 U.S.C. 154(b) by 244 days.

(21) Appl. No.: 13/022,976

(22) Filed: Feb. 8, 2011

(65) Prior Publication Data

US 2011/0197193 A1    Aug. 11, 2011

(30) Foreign Application Priority Data

Feb. 10, 2010    (JP) .................................. 2010-027594

(51) Int. Cl.
 *G06F 9/46*    (2006.01)
(52) U.S. Cl.
 USPC ............................................. 718/100; 714/57
(58) Field of Classification Search
 None
 See application file for complete search history.

(56) References Cited

U.S. PATENT DOCUMENTS

| 6,167,511 | A  | * | 12/2000 | Lewis ............................... 713/2 |
| 2002/0124215 | A1 | * | 9/2002 | Austen et al. .................... 714/57 |
| 2004/0260936 | A1 | * | 12/2004 | Hiray et al. .................... 713/200 |
| 2005/0055486 | A1 | * | 3/2005 | Natu et al. ..................... 710/260 |
| 2005/0267956 | A1 | * | 12/2005 | Huang ........................... 709/223 |
| 2006/0143209 | A1 | * | 6/2006 | Zimmer et al. ................ 707/101 |
| 2006/0206286 | A1 | * | 9/2006 | Mugunda et al. ............. 702/182 |
| 2008/0130893 | A1 | * | 6/2008 | Ibrahim et al. ................ 380/277 |
| 2008/0256400 | A1 | * | 10/2008 | Yang et al. ....................... 714/57 |
| 2009/0049221 | A1 | * | 2/2009 | Rangarajan et al. .......... 710/268 |

FOREIGN PATENT DOCUMENTS

| JP | 11-296320 A | 10/1999 |
| JP | 2007109238 A | 4/2007 |
| JP | 2009118728 A | 5/2009 |

OTHER PUBLICATIONS

Japanese Office Action for JP2010-027594 issued Feb. 3, 2012.
H. Deki et al., "Express5800/50 Series BIOS Technology", NEC Technical Report, NEC Corporation, vol. 55, No. 7, Jul. 25, 2002, pp. 68-71.
"Intelligent Platform Management Interface Specifications", Second Generation v2.0, [online] Internet search on Feb. 10. 2010 <http://www.intel.com/design/servers/ipmi/spec.htm>.

* cited by examiner

*Primary Examiner* — Emerson Puente
*Assistant Examiner* — Mehran Kamran
(74) *Attorney, Agent, or Firm* — Sughrue Mion, PLLC

(57) ABSTRACT

A communication control device controls communication between a BIOS (Basic Input/Output System) and a BMC (Baseboard Management Controller). The device includes a processor that performs a process of an OS (Operating System) and a process of the BIOS. When a communication request for communication with the BMC occurs from the BIOS or OS, the processor performs a process associated with the communication request by dividing it into a first process and a second process. The first process is configured to store contents of the communication request and make the OS restart a process without performing the communication between the BIOS and the BMC in response to the communication request. The second process is configured to actually perform the communication between the BIOS and the BMC in response to the stored communication request.

12 Claims, 8 Drawing Sheets

DEVICE AND METHOD FOR CONTROLLING COMMUNICATION BETWEEN BIOS AND BMC

This application is based upon and claims the benefit of priority from prior Japanese Patent Application No. 2010-027594, filed Feb. 10, 2010, the entire contents of which are incorporated herein.

TECHNICAL FIELD

The present invention relates to a device and method for controlling communication between a BIOS (Basic Input/Output System) and a BMC (Baseboard Management Controller) and, in particular, to a device and method for performing a process of a communication request in a communication path of the BIOS and BMC.

BACKGROUND ART

In a high-end server, in response to an instruction from an OS (Operating System) or as a result of judgment by the BIOS, the BIOS communicates with the BMC. Thanks to the communication, various kinds of platform management control, such as power control, dynamic configuration control or failure management, are performed. One example of a technique pertaining to such platform management control is disclosed in PTL 1. With the technique disclosed in PTL 1, when a recoverable error occurs, it is possible to make a log of information indicating a source of the error and the location of the source (see specification paragraph number [0010] to [0013] of PTL 1, for example).

For communication between the OS or BIOS and the BMC, industry standards have been put in place. The standards are disclosed in NPL 1. What is described in NPL 1 is several methods for the OS or BIOS to communicate with the BMC.

CITATION LIST

Patent Literature

{PTL 1} JP-A-2007-109238

Non-Patent Literature

{NPL 1} "Intelligent Platform Management Interface Specification Second Generation v2.0," [online] Internet search on Feb. 10, 2010 <http://www.intel.com/design/servers/ipmi/spec.htm>

SUMMARY OF INVENTION

Technical Problem

If the standards disclosed in the above NPL 1 are followed, there are mainly three chances for the BIOS to communicate with the BMC while the OS is running.

The first chance is when, out of interfaces that the BIOS offers the OS, the one that needs to work together with the BMC is called by the OS. The second chance is when, after the OS performs a method of the ACPI (Advanced Configuration and Power Interface) tree, it becomes necessary to work together with the BMC in the process. The third chance is when, after a failure occurs, the BIOS needs to work together with the BMC in the failure management process.

Since a plurality of the chances described above is independent of one another, a plurality of communication requests for the BIOS's communication with the BMC could occur anytime. However, the number of communication paths between the BIOS and the BMC is restricted due to the limitations of hardware, allowing the situation to occur where it is impossible to process all communication requests. In such a case, the BIOS generally carries out exclusive control over the communication paths between the BIOS and the BMC using a semaphore and performs a process of waiting to start communication within the BIOS while the semaphore is locked.

During the BIOS process, a corresponding processor cannot perform an OS task. Therefore, according to a typical method, if it takes time to perform communication because of a decrease in the performance of the BMC or the like, a process that the OS needs to perform is not carried out and the OS detects a problem. At worst, the system could shut down.

It can be said that, when a plurality of communication requests occurs at the same time in the BIOS or when it takes time for the BMC to perform a communication process to receive communication because of a decrease in performance or the like, what is required is a technique that allows the communication from the BIOS to go on without the operation of the OS being affected.

The exemplary object of the present invention is to provide a method of enhancing a communication path between the BIOS and the BMC and a device and program thereof that enable a communication request to be processed without the operation of the OS being affected in the communication path between the BIOS and the BMC.

Solution to Problem

According to a first exemplary aspect of the present invention, there is provided a communication control device for controlling communication between a BIOS (Basic Input/Output System) and a BMC (Baseboard Management Controller), comprising: a processor that performs a process of an OS (Operating System) and a process of the BIOS, and, when a communication request for communication with the BMC occurs from the BIOS or OS, performs a process associated with the communication request by dividing it into a first process and a second process, the first process being configured to store contents of the communication request and make the OS restart a process without performing the communication between the BIOS and the BMC in response to the communication request, and the second process being configured to actually perform the communication between the BIOS and the BMC in response to the stored communication request.

According to a second exemplary aspect of the present invention, there is provided a method of controlling communication between a BIOS (Basic Input/Output System) and a BMC (Baseboard Management Controller), comprising: a step of, when a communication request for communication with the BMC occurs from the BIOS or an OS (Operating System), performing a process associated with the communication request by dividing it into a first process and a second process, the first process being configured to store contents of the communication request and make the OS restart a process without performing the communication between the BIOS and the BMC in response to the communication request, and the second process being configured to actually perform the communication between the BIOS and the BMC in response to the stored communication request.

According to a third exemplary aspect of the present invention, there is provided a computer-readable medium stored therein a communication control program for controlling communication between a BIOS (Basic Input/Output System) and a BMC (Baseboard Management Controller) for causing a computer to function as a communication control device comprising: a processor that performs a process of an OS (Operating System) and a process of the BIOS, and, when a communication request for communication with the BMC occurs from the BIOS or OS, performs a process associated with the communication request by dividing it into a first process and a second process, the first process being configured to store contents of the communication request and make the OS restart a process without performing the communication between the BIOS and the BMC in response to the communication request, and the second process being configured to actually perform the communication between the BIOS and the BMC in response to the stored communication request.

Advantageous Effects of Invention

According to the present invention, since the control by the BIOS of the communication with the BMC is divided before being performed with the use of the communication queue and the regular interrupts into the BIOS, the BIOS's communication process with the BMC is possible without a process of the OS being affected.

DESCRIPTION OF EMBODIMENTS

First, an exemplary embodiment of the present invention is outlined. According to the exemplary embodiment of the present invention, what is provided in a BIOS is a queue that stores requests for communication with a BMC. Moreover, what is provided is a unit that raises interrupts regularly for the BIOS. With the use of the above, the control of the communication between the BIOS and the BMC by the BIOS is divided before being performed. Thanks to the division, it is possible to reduce the time during which the BIOS continuously occupies a processor, as well as to process requests for communication with the BMC from a plurality of BIOSs while performing an OS task without the operation of the OS being affected. The outline of the exemplary embodiment of the present invention has been described above.

The following describes in detail the configuration of the exemplary embodiment of the present invention with reference to the accompanying drawings.

Figure 1:
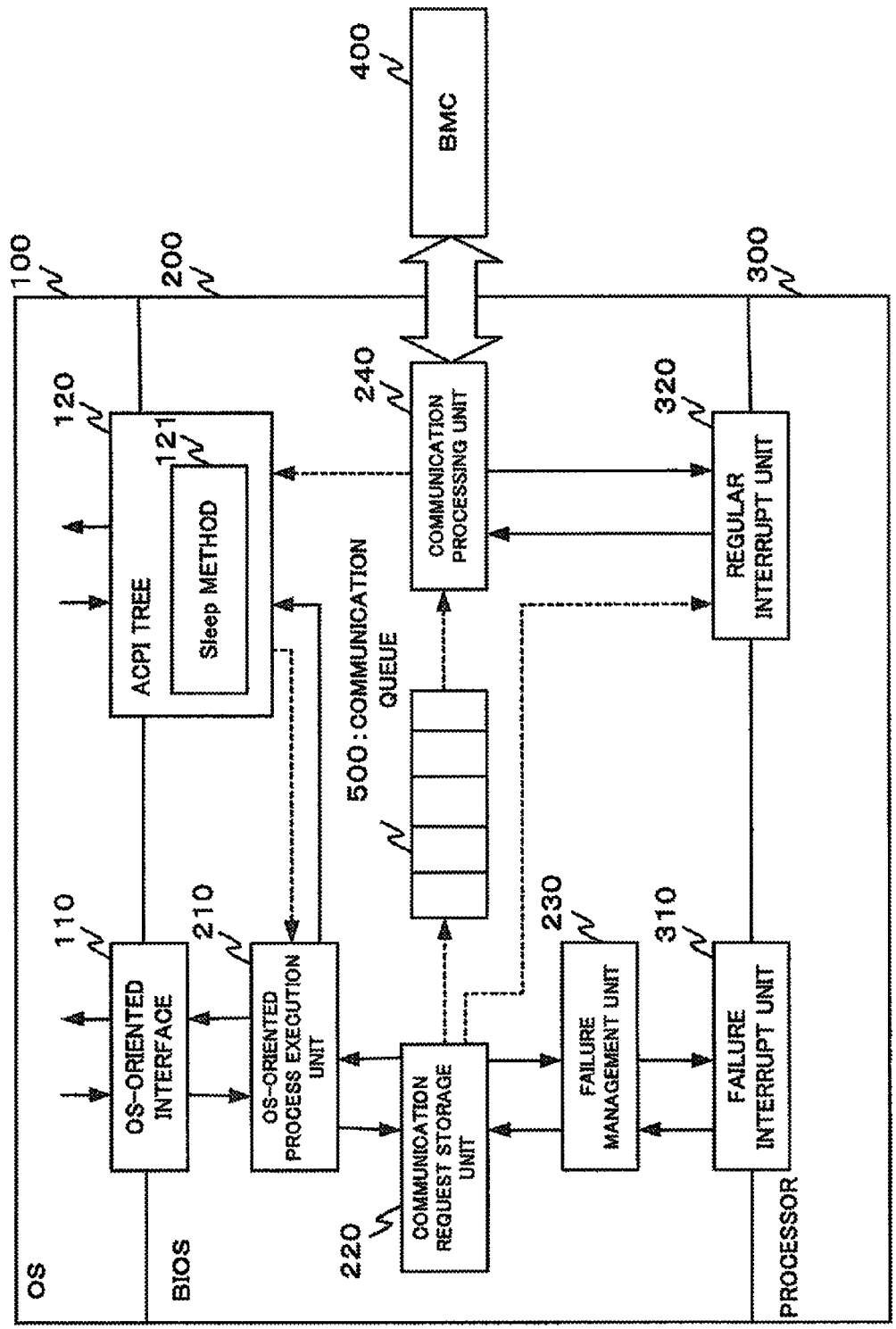
FIG. 1 A diagram showing a basic configuration of an exemplary embodiment of the present invention.

Referring to FIG. 1, the exemplary embodiment of the present invention includes an OS 100, a BIOS 200, a processor 300, and a BMC 400.

The OS 100 and the BIOS 200 are run by the processor 300. The processor 300 generally performs a process of the OS 100. The processor 300 cannot perform the process of the OS 100 while a process of the BIOS 200 is being performed.

The BMC 400 includes another processor besides the processor 300 (the another processor is not shown in the diagram).

The BIOS 200 provides the OS 100 with an OS-oriented interface 110 and an ACPI tree 120. The OS 100 uses a function offered by the BIOS 200 through the OS-oriented interface 110 and the ACPI tree 120.

Here, a concrete example of the OS-oriented interface 110 is an EFI (Extensible Firmware Interface) service or the like, which is a standard service used in a high-end server. The functions offered by the BIOS 200 to the OS 100 through the OS-oriented interface 110 include a function of shutting down a system and other functions. Several methods (functions) are set in the ACPI tree 120. The OS 100 calls a method in the ACPI tree 120 to use functions offered by the BIOS 200, including a function of dynamically changing the constituent elements of the system.

Incidentally, a Sleep method 121 exemplified in FIG. 1 is a method defined by an ACPI standard that exists within the ACPI tree 120. When the Sleep method 121 is called, the control of the processor returns to a caller after a predetermined period of time specified by Sleep method 121 has passed. In the waiting time during which the Sleep method 121 is called and then returns to the caller, the processor that has called the Sleep method 121 is subjected to task scheduling by the OS. The behavior is in line with a standard specification of the Sleep method.

A failure interrupt unit 310 and a regular interrupt unit 320 are units that allow the control of the processor 300, which usually performs the process of the OS 100, to cut into the BIOS 200.

The failure interrupt unit 310 allows the control of the processor 300 to cut into the BIOS 200 when a failure occurs.

The regular interrupt unit 320 allows the control of the processor 300 to cut into the BIOS 200 every time a communication request storage unit 220 of the BIOS 200 issues an instruction.

The BIOS 200 includes an OS-oriented process execution unit 210, the communication request storage unit 220, a failure management unit 230, a communication processing unit 240, and a communication queue 500.

The OS-oriented process execution unit 210 is called through the OS-oriented interface 110 and the ACPI tree 120. The OS-oriented process execution unit 210 performs a process specified by the OS 100.

The communication request storage unit 220 is called from the OS-oriented process execution unit 210 and the failure management unit 230. The communication request storage unit 220 stores a request for communication with the BMC 400 in the communication queue 500.

The communication queue 500 is built on a memory controlled by the BIOS 200. The communication queue 500 holds a request for communication with the BMC 400.

The failure management unit 230 is called from the failure interrupt unit 310 and performs a failure management process such as collecting failure logs.

The communication processing unit 240 is called from the regular interrupt unit 320 and processes a request for communication with the BMC 400, which is stored in the communication queue 500.

The following describes in detail an operation of the present exemplary embodiment with reference to flowcharts shown in FIGS. 1, 2 and 3 to 7. The following describes the operations of four cases.

Figure 3:
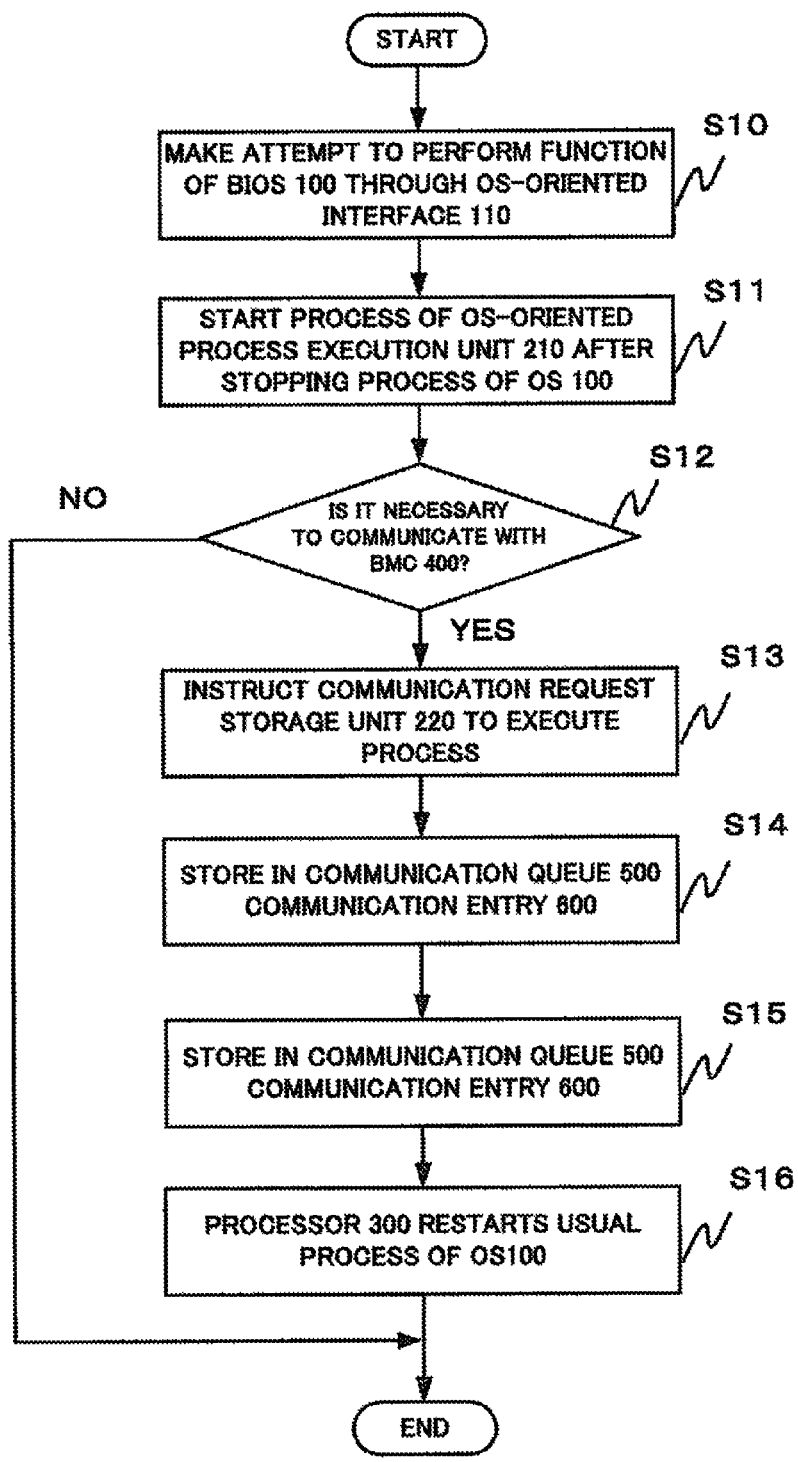
FIG. 3 A diagram (1/5) showing a basic operation of the exemplary embodiment of the present invention.

First, with reference to a flowchart shown in FIG. 3, what is described is an operation in the case where the OS 100 makes an attempt to perform a function of the BIOS 100 through the OS-oriented interface 110.

First, the OS 100 makes an attempt to perform a function of the BIOS 100 through the OS-oriented interface 110 (Step S10).

In this case, the processor 300 stops a process of the OS 100 and starts a process of the OS-oriented process execution unit 210 (Step S11).

When it is necessary for the process of the OS-oriented process execution unit 210 to communicate with the BMC 400 (Yes at step S12), the OS-oriented process execution unit 210 calls the communication request storage unit 220 and instructs the communication request storage unit 220 to execute a process (Step S13).

The communication request storage unit 220 that has received the instruction at step S200 stores in the communication queue 500 a communication entry 600 (Step S14).

Figure 2:
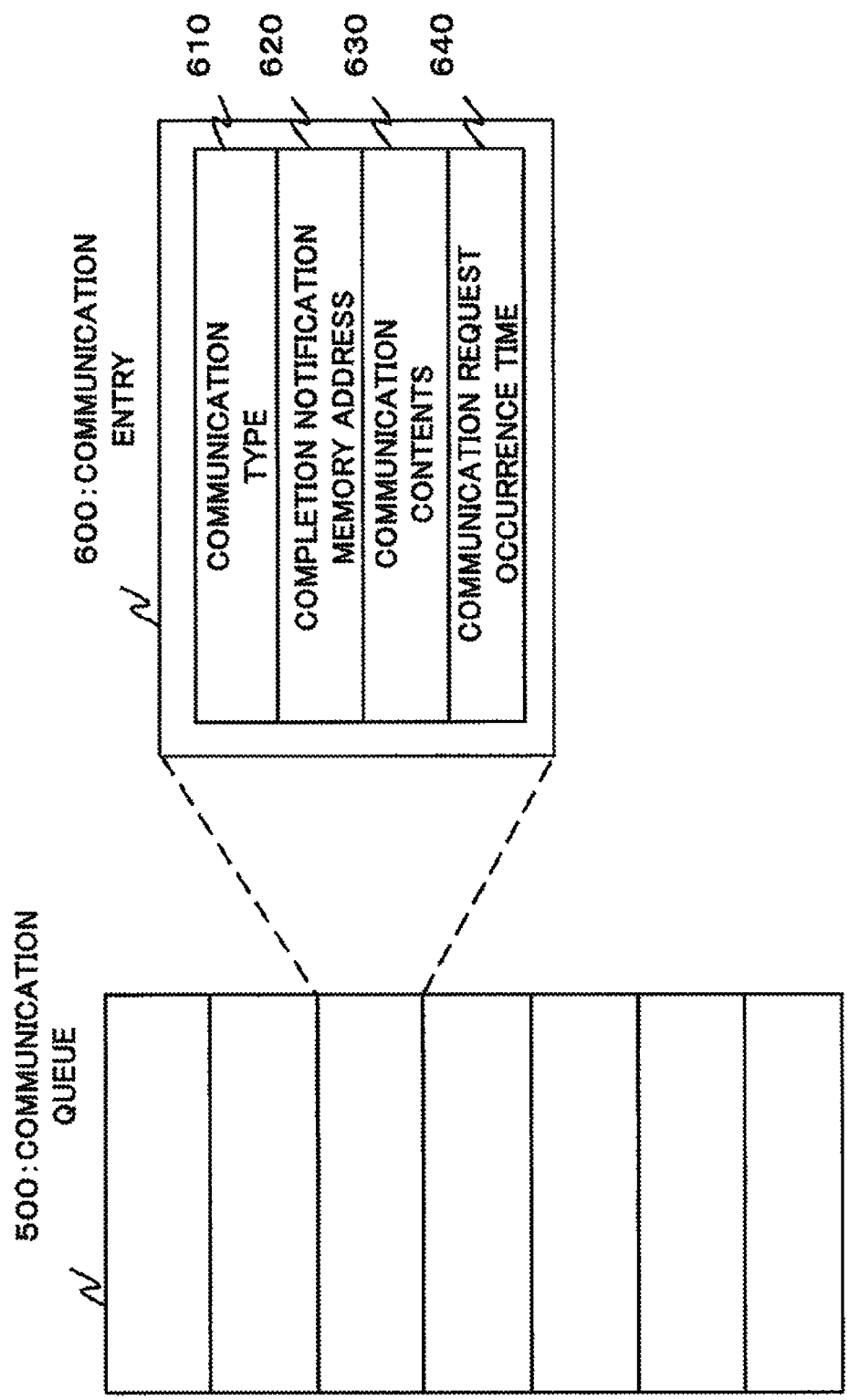
FIG. 2 A diagram showing a basic configuration of a communication queue and communication entry according to the exemplary embodiment of the present invention.

Here, the communication entry 600 will be described with reference to FIG. 2. The communication entry 600 includes a communication type 610, a completion notification memory address 620, communication contents 630, and a communication request occurrence time 640.

What is stored in the communication type 610 is a value indicating that the occurrence of the communication request is triggered by the OS-oriented interface 110. In this case, the value of the completion notification memory address 620 is not particularly fixed. What is stored in the communication contents 630 is the contents that are to be transmitted to the BMC 400. What is stored in the communication request occurrence time 640 is a value representing the current time.

Then, the communication request storage unit 220 programs the regular interrupt unit 320 in advance for an interrupt into the BIOS 200 (Step S15). The process of the communication request storage unit 220 is completed for a very short period of time. The reason is that the process is completed just after data on a memory is rewritten.

After the execution of the communication request storage unit 220 is completed, the execution of the OS-oriented process execution unit 210 is also completed. The processor 300 then starts the usual process of the OS 100 (step S16).

As described above, the process of communicating with the BMC 400 that is included in the process of the BIOS 200 until the processor 300 starts to execute the process of the OS 100 again is completed for a very short period of time. Therefore, the process by the BIOS 200 of communicating with the BMC 400 does not have a harmful effect on the operation of the OS 100.

Figure 4:
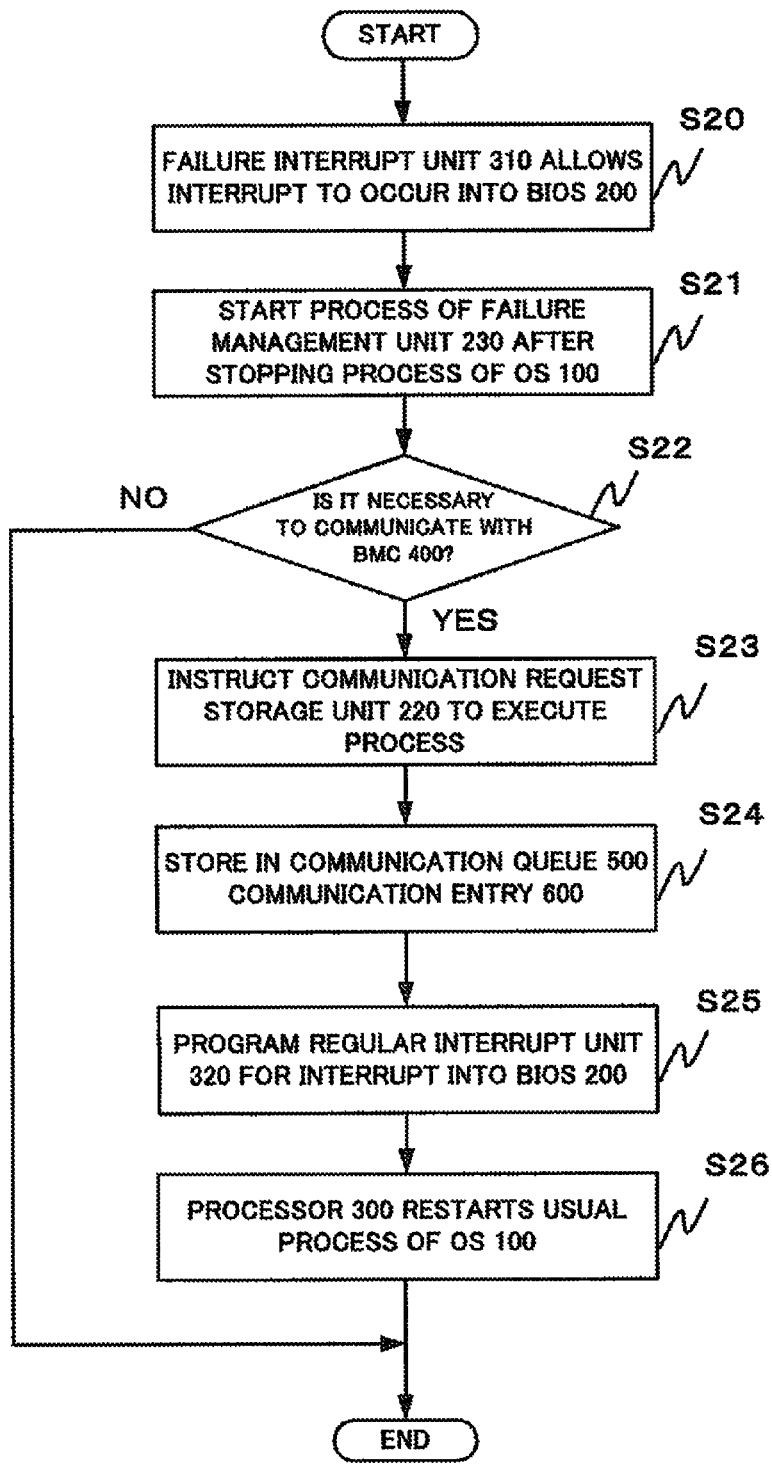
FIG. 4 A diagram (2/5) showing a basic operation of the exemplary embodiment of the present invention.

Then, with reference to a flowchart shown in FIG. 4, what is described is an operation in the case where the failure interrupt unit 310 allows the process of the processor 300 to cut into the BIOS 200 when some sort of failure occurs.

First, the failure interrupt unit 310 allows an interrupt to occur into the BIOS 200 (Step S20).

After the interrupt occurs, the processor 300 stops a process of the OS 100 and starts the execution of the failure management unit 230 of the BIOS 200 (Step S21).

When it is necessary for the process of the failure management unit 230 to communicate with the BMC 400 (Yes at step S22), the failure management unit 230 calls the communication request storage unit 220 and instructs the communication request storage unit 220 to execute a process (Step S23).

The process of the communication request storage unit 220, which is called from the failure management unit 230, is similar to the process called from the OS-oriented process execution unit 210, except that the value stored in the communication type 610 is replaced with a value indicating that the occurrence of the communication is triggered by the occurrence of the failure; the process of the communication request storage unit 220 is completed for a very short period of time (Steps S24 and S25).

After the communication request storage unit 220 is completed, the failure management unit 230 recovers quickly from the interrupt (Step S26). Therefore, the processor 300 restarts the process of the OS 100. The process that the BIOS 200 performs to communicate with the BMC 400 until the failure management unit 230 recovers from the interrupt is completed for a very short period of time. Therefore, the process by the BIOS 200 of communicating with the BMC 400 does not have a harmful effect on the operation of the OS 100.

Figure 5:
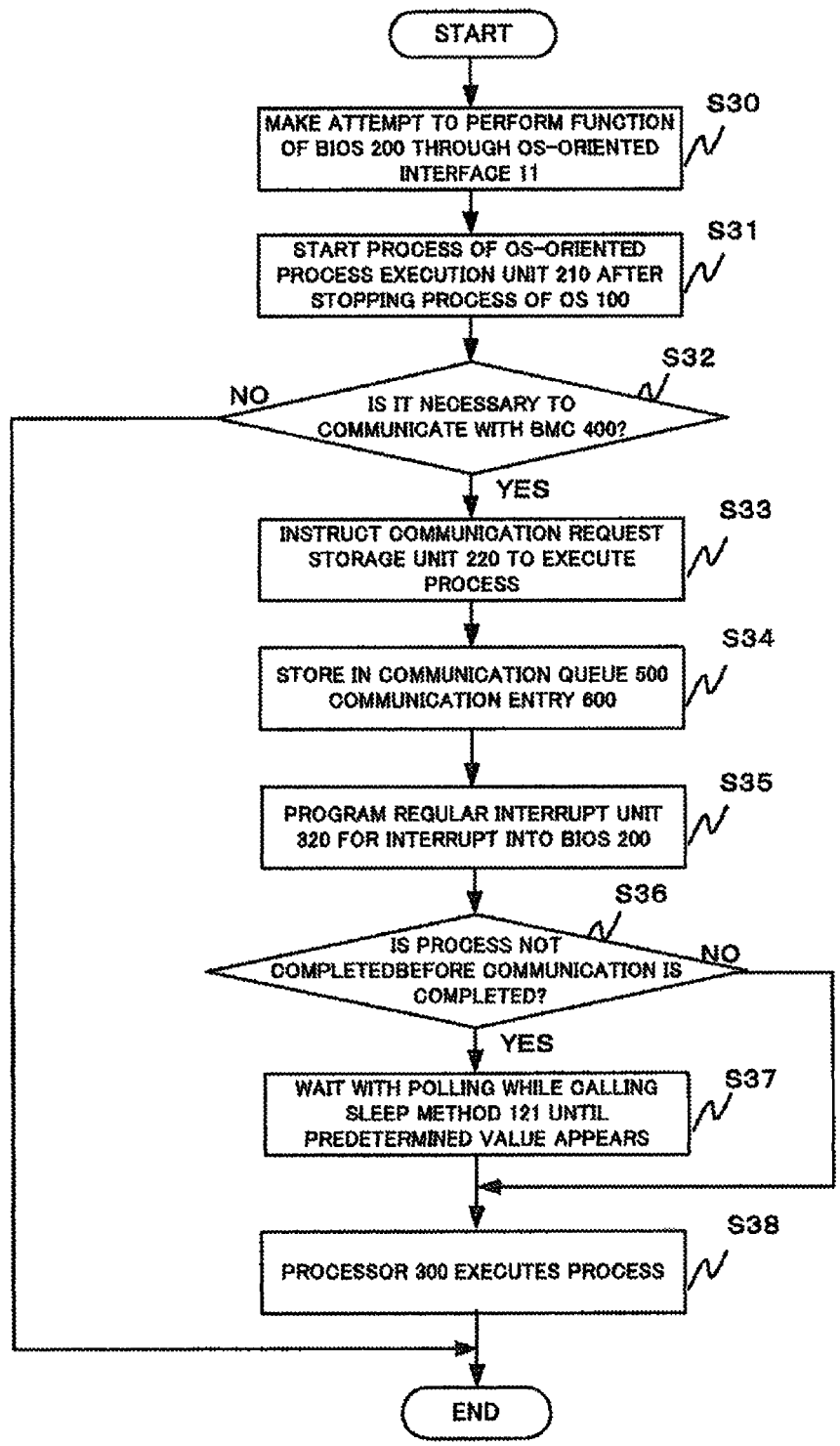
FIG. 5 A diagram (3/5) showing a basic operation of the exemplary embodiment of the present invention.

Then, with reference to a flowchart shown in FIG. 5, what is described is an operation in the case where the OS 100 makes an attempt to perform a function of the BIOS 200 through the ACPI tree 120.

In a similar way to the case where the function of the BIOS 200 is executed through the OS-oriented interface 110, the processor 300 stops a process of the OS 100 and executes the OS-oriented process execution unit 210. When it is necessary to communicate with the BMC 400 (Yes at step S32), the communication request storage unit 220 is executed (Steps S30 to S33).

The process of the communication request storage unit 220 is similar to that of the case where the process of the BIOS 200 is called through the OS-oriented interface 110, except for the following two different points; the process of the communication request storage unit 220 is completed for a very short period of time. The first different point is that a value indicating that the occurrence of the communication is triggered by the ACPI tree 120 is stored in the communication type 610. The second different point is that what is stored in the completion notification memory address 620 is an address for a memory area that can be accessed from the BIOS 200 and the ACPI tree 120 (Steps S34 and S35).

After the process of the communication request storage unit 220 is completed, the process of the OS-oriented process execution unit 210 is also completed. The processor 300 starts to execute the processes of the ACPI tree 120 (No at step S36, and step S38).

Among the processes of the ACPI tree 120, there is a process that is not completed before the communication of the communication entry 600 stored in the communication queue 500 is completed. For such a process (Yes at step S36), the ACPI tree 120 waits with polling while calling the Sleep method 121 until a value of an area specified by an address stored in the completion notification memory address 620 comes to a predetermined value (Step S37). The waiting process does not have a harmful effect on the operation of the OS 100. The reason is that the processor 300 that has called the Sleep method 121 is subjected to task scheduling by the OS 100 and can execute the process of the OS 100.

Figure 6:
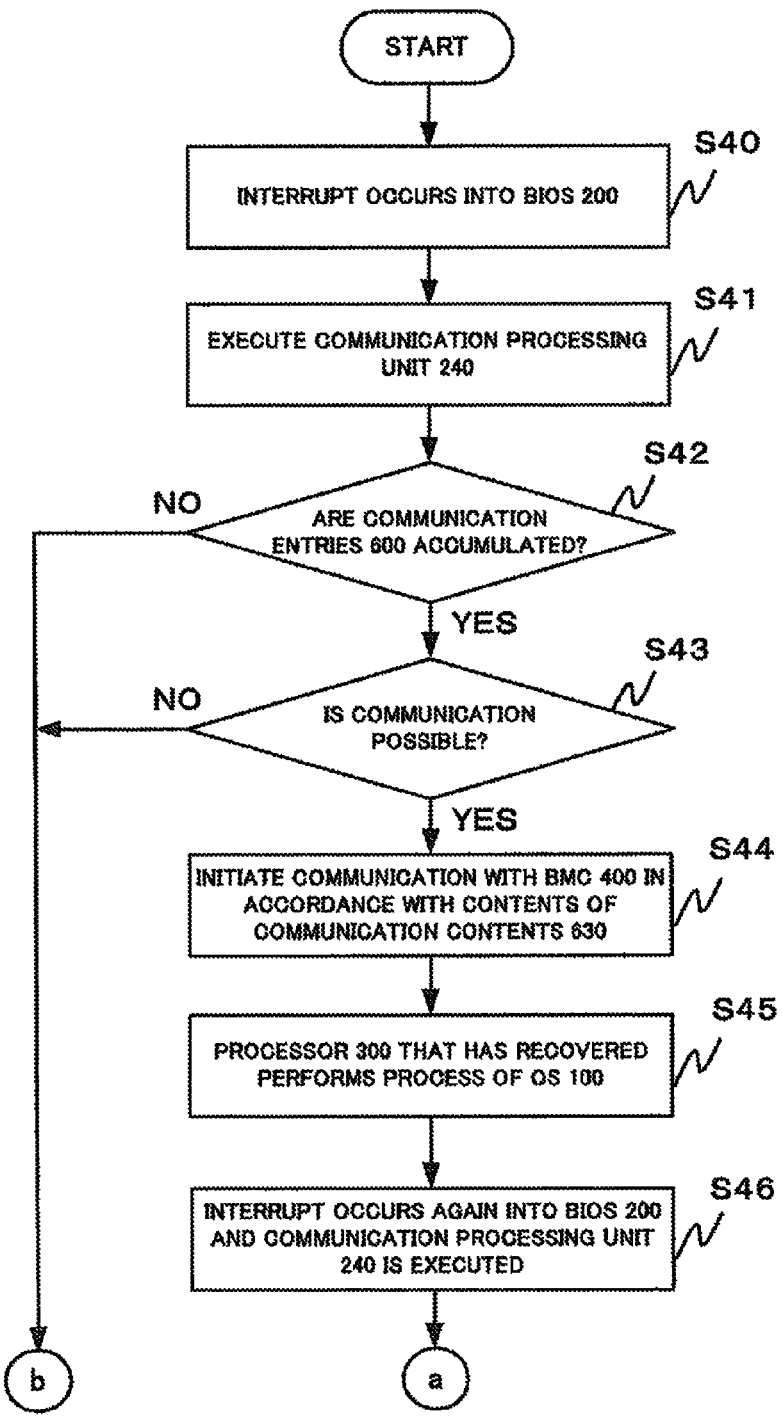
FIG. 6 A diagram (4/5) showing a basic operation of the exemplary embodiment of the present invention.
Figure 7:
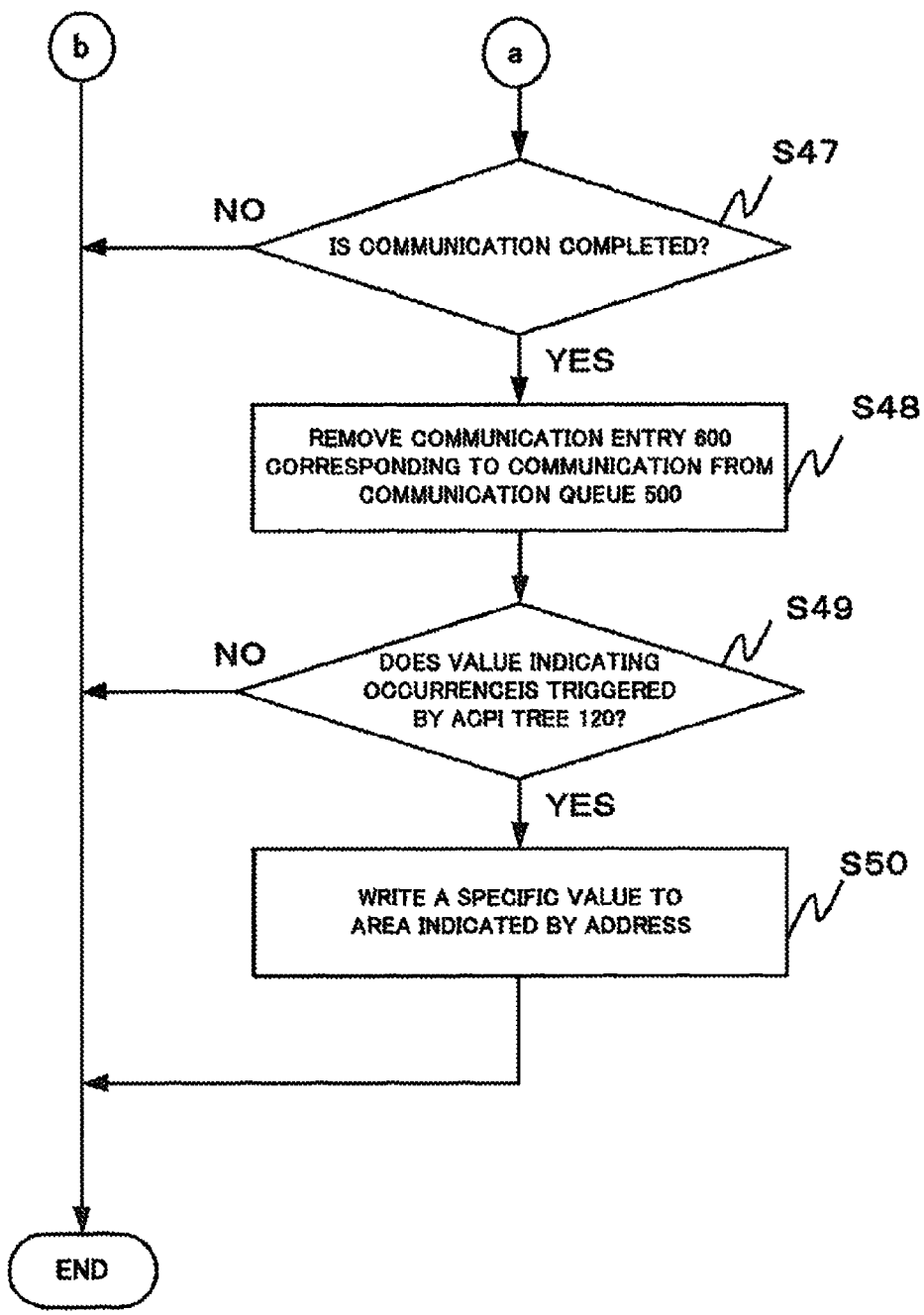
FIG. 7 A diagram (5/5) showing a basic operation of the exemplary embodiment of the present invention.

The following describes a process for communication entries 600 accumulated in the communication queue 500 with reference to flowcharts shown in FIGS. 6 and 7.

First, the communication request storage unit 220 allows an interrupt, which is programmed in advance in the regular interrupt unit 320, to occur into the BIOS 200 (Step S40).

Then, the processor 300 executes the communication processing unit 240 (Step S41).

The communication processing unit 240 first checks the contents of the communication queue 500 to confirm whether the communication entries 600 are accumulated (Step S42).

When there is no communication entry 600 (No at step S42), the communication processing unit 240 recovers quickly from the interrupt. When there is a communication entry 600 (Yes at step S42), the communication processing unit 240 looks up a communication path to the BMC 400 and checks if it is possible to communicate (Step S43).

When the situation does not allow the communication processing unit 240 to communicate (No at step S43), the communication processing unit 240 recovers quickly from the interrupt. When the situation allows the communication processing unit 240 to communicate (Yes at step S43), the communication processing unit 240 initiates communication with the BMC 400 in accordance with the contents of the communication contents 630 of the communication entry 600 (Step S44).

However, at step S44, for example, if the contents of the communication contents 630 indicate that the time of the current OS 100 is to be transmitted to the BMC 400, time information included in the communication contents 630 is a value at a time when a communication request occurs. If the time information, without being changed, is transmitted to the BMC 400, then the time of the current OS 100 is not transmitted to the BMC 400 correctly because there is a difference in time between the occurrence of the communication request and the actual start of the communication with the BMC 400. Therefore, for the communication involving such time information, the communication processing unit 240 appropriately corrects the contents of the communication with the BMC 400 in accordance with the contents of the communication request occurrence time 640. The communication processing unit 240 that has initiated the communication recovers quickly from the interrupt.

The processor 300 that has recovered from the interrupt process of the communication processing unit 240 performs the process of the OS 100 (Step S45).

After a certain period of time has passed, the regular interrupt unit 320 allows an interrupt to occur again into the BIOS 200 and the communication processing unit 240 is executed (Step S46).

If communication with the BMC 400 has started the last time the communication processing unit 240 is executed, the communication processing unit 240 looks up a communication path to the BMC 400 and confirms whether the communication has been completed (Step S47).

When the communication has not been completed (No at step S47), the communication processing unit 240 promptly recovers from the interrupt.

When the communication has been completed (Yes at step S47), the communication processing unit 240 removes the communication entry 600 corresponding to the communication from the communication queue 500 (Step S48). When the communication type 610 at the time is a value indicating that the communication is triggered by the ACPI tree 120 (Yes at step S49), the communication processing unit 240 writes a specific value to an area indicated by an address stored in the completion notification memory address 620 (Step S50). Then, the communication processing unit 240 promptly recovers from the interrupt. Thanks to the writing at step S50, in the ACPI tree 120, the process that is calling the Sleep method 121 while waiting for the completion of the communication is completed.

When the communication type 610 is not a value indicating that the communication is triggered by the ACPI tree 120 (No at step S49), the communication processing unit 240 that has removed the communication entry 600 from the communication queue 500 recovers quickly from the interrupt.

As described above, in any case, the execution of the communication processing unit 240 does not affect the operation of the OS 100. The reason is that the process of the communication processing unit 240 do not involve a waiting process and the like and the processor 300 executes the communication processing unit 240 for a very short period of time.

Figure 8:
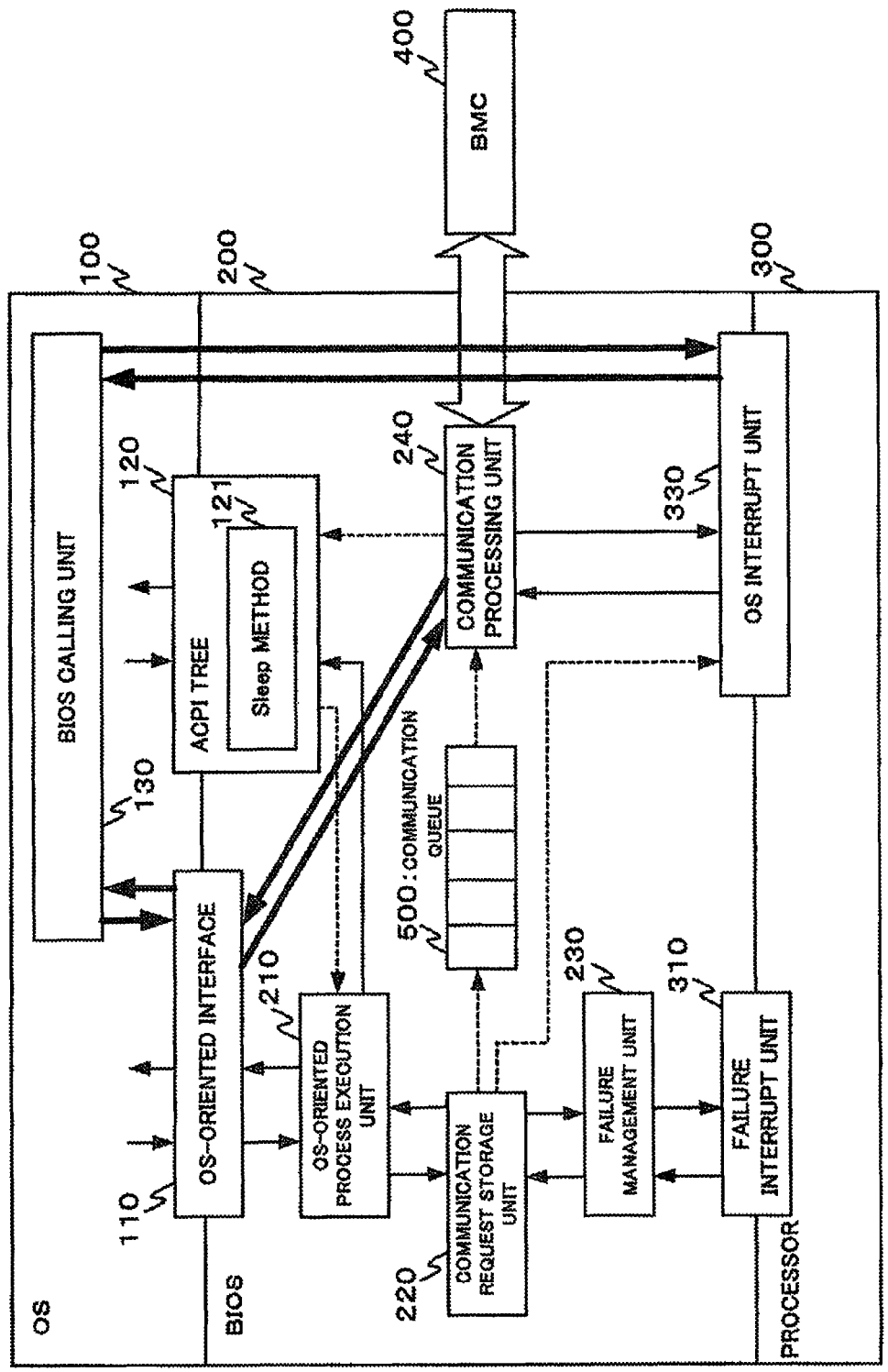
FIG. 8 A diagram showing a basic configuration of a variant example of the exemplary embodiment of the present invention.

The following describes a variant example of the above-described exemplary embodiment with reference to FIG. 8.

Referring to FIG. 8, when compared with the exemplary embodiment shown in FIG. 1, the present exemplary embodiment is different in the following three points. The first point is that there is no regular interrupt unit 320. The second is that there is an OS interrupt unit 330. The third is that the OS 100 includes a BIOS calling unit 130.

Incidentally, in FIG. 4, in order to clarify different connections from those shown in FIG. 1, the different connections from those shown in FIG. 1 are indicated by bold arrows.

The OS interrupt unit 330 makes the processor 300 execute the BIOS calling unit 130 regularly. The BIOS calling unit 130 calls the communication processing unit 240 of the BIOS 200 through the OS-oriented interface 110.

The process of the called communication processing unit 240 is the same as that in the above exemplary embodiment. The process of storing the communication entry 600 in the communication queue 500 is also the same as that in the above exemplary embodiment. Therefore, the processes will not be explained again.

The above-described exemplary embodiments of the present invention have the following advantages.

The first advantage is that the BIOS's communication process with the BMC is possible without a process of the OS being affected.

The reason is that since the control by the BIOS of the communication with the BMC is divided before being performed with the use of the communication queue and the regular interrupts into the BIOS, it is possible to reduce the time during which the BIOS continuously occupies the processor.

The second advantage is that even when a plurality of requests for communication with the BMC occurs, the BIOS can process all the communication requests.

The reason is that the communication process at the time the communication request occurs only involves a very short-term process of storing the communication request in the communication queue and the actual communication with the BMC takes place later. Therefore, the processing time at the time when the communication request occurs is completed for a very short period of time.

Incidentally, a communication path enhancement device of the exemplary embodiment of the present invention between the BIOS and the BMC may be realized by hardware. However, the communication path enhancement device may also be realized by a computer that executes a program, which causes the computer to function as a communication path enhancement device between the BIOS and the BMC, after loading the program from a computer-readable recording medium.

A communication path enhancement method of the exemplary embodiment of the present invention between the BIOS and the BMC may be realized by hardware. However, the communication path enhancement method may also be realized by a computer that executes a program, which causes the computer to execute the method, after loading the program from a computer-readable recording medium.

The above-described exemplary embodiments are preferred exemplary embodiments of the present invention. However, the scope of the present invention is not limited only to the above exemplary embodiments. Various modifications may be made on the exemplary embodiments without departing from the scope of the present invention.

The whole or part of the exemplary embodiments disclosed above can be described as, but not limited to, the following supplementary notes.

(Supplementary note 1) A communication control device for controlling communication between a BIOS (Basic Input/Output System) and a BMC (Baseboard Management Controller), comprising: a processor that performs a process of an OS (Operating System) and a process of the BIOS, and, when a communication request for communication with the BMC occurs from the BIOS or OS, performs a process associated with the communication request by dividing it into a first process and a second process, the first process being configured to store contents of the communication request and make the OS restart a process without performing the communication between the BIOS and the BMC in response to the communication request, and the second process being configured to actually perform the communication between the BIOS and the BMC in response to the stored communication request.

(Supplementary note 2) The communication control device according to Supplementary note 1, wherein the processor includes: a unit that prepares a communication queue that stores a communication entry, which is information used to identify the contents of the communication request to the BMC; and a communication request storage unit that suspends a process of the OS when the communication request occurs, stores in the communication queue the communication entry corresponding to the communication request, programs a regular interrupt into the BIOS in advance for a process of the stored communication entry, and then makes the OS restart a process.

(Supplementary note 3) The communication control device according to Supplementary note 2, wherein the processor further includes: a regular interrupt unit that allows an interrupt to occur into the BIOS at intervals associated with the programming as well as suspending a process of the OS; and a communication processing unit that checks the communication queue after the interrupt occurs and, when the communication entry is stored in the communication queue and when it is possible to communicate with the BMC, starts the communication with the BMC in response to the communication request as well as making the OS restart a process.

(Supplementary note 4) The communication control device according to Supplementary note 3, wherein the processor further includes: a unit that, after the communication with the BMC starts in the communication processing unit, when the interrupt occurs again, checks the communication queue again and, when the check result shows that there is a communication entry for which the communication is already completed, deletes the communication entry.

(Supplementary note 5) A method of controlling communication between a BIOS (Basic Input/Output System) and a BMC (Baseboard Management Controller), comprising: a step of, when a communication request for communication with the BMC occurs from the BIOS or an OS (Operating System), performing a process associated with the communication request by dividing it into a first process and a second process, the first process being configured to store contents of the communication request and make the OS restart a process without performing the communication between the BIOS and the BMC in response to the communication request, and the second process being configured to actually perform the communication between the BIOS and the BMC in response to the stored communication request.

(Supplementary note 6) The method of controlling communication according to Supplementary note 5, further comprising: a step of preparing a communication queue that stores a communication entry, which is information used to identify the contents of the communication request to the BMC; and a communication request storage step of suspending a process of the OS when the communication request occurs, storing in the communication queue the communication entry corresponding to the communication request, programming a regular interrupt into the BIOS in advance for a process of the stored communication entry, and then making the OS restart a process.

(Supplementary note 7) The method of controlling communication according to Supplementary note 6, further comprising: a regular interrupt step of allowing an interrupt to occur into the BIOS at intervals associated with the programming as well as suspending a process of the OS; and a communication processing step of checking the communication queue after the interrupt occurs and, when the communication entry is stored in the communication queue and when it is possible to communicate with the BMC, starting the communication with the BMC in response to the communication request as well as making the OS restart a process.

(Supplementary note 8) The method of controlling communication according to Supplementary note 7, further comprising: a step of, after the communication with the BMC starts at the communication processing step, when the interrupt occurs again, checking the communication queue again and, a step of, when the check result shows that there is a communication entry for which the communication is already completed, deleting the communication entry.

(Supplementary note 9) The method of controlling communication according to any one of Supplementary notes 5 to 8, wherein, when the communication request is a communication request from an ACPI tree and when the contents of the communication request do not allow a process to be completed before the communication with the BMC comes to an end, the ACPI tree waits with polling while calling a Sleep method between the first and second processes.

(Supplementary note 10) A computer-readable medium stored therein a communication control program for controlling communication between a BIOS (Basic Input/Output System) and a BMC (Baseboard Management Controller) for causing a computer to function as a communication control device comprising: a processor that performs a process of an OS (Operating System) and a process of the BIOS, and, when a communication request for communication with the BMC occurs from the BIOS or OS, performs a process associated with the communication request by dividing it into a first process and a second process, the first process being configured to store contents of the communication request and make the OS restart a process without performing the communication between the BIOS and the BMC in response to the communication request, and the second process being configured to actually perform the communication between the BIOS and the BMC in response to the stored communication request.

INDUSTRIAL APPLICABILITY

According to the present invention, it is possible for the BIOS to communicate with an external unit without the OS being affected. Therefore, the present invention can be applied to a typical computer in which there is some sort of element for communicating with the BIOS outside the OS and the BIOS.

REFERENCE SIGNS LIST

100: OS
110: OS-oriented interface
120: ACPI tree
121: Sleep method
130: BIOS calling unit
200 BIOS
210: OS-oriented process execution unit
220: Communication request storage unit
230: Failure management unit
240: Communication processing unit
300: Processor
310: Failure interrupt unit
320: Regular interrupt unit
330: OS interrupt unit
400: BMC
500: Communication queue
600: Communication entry
610: Communication type
620: Completion notification memory address
630: Communication contents
640: Communication request occurrence time

The invention claimed is:

1. A communication control device for controlling communication between a BIOS (Basic Input/Output System) and a BMC (Baseboard Management Controller), comprising:
a processor that performs a process of an OS (Operating System) and a process of the BIOS, and, when a communication request for communication with the BMC occurs from the BIOS or OS, performs a process associated with the communication request by dividing it into a first process and a second process,
the first process being configured to store contents of the communication request and make the OS restart a process without performing the communication between the BIOS and the BMC in response to the communication request, and
the second process being configured to actually perform the communication between the BIOS and the BMC in response to the stored communication request without performing a waiting process,
wherein said second process is regularly performed at only certain intervals.

2. The communication control device according to claim 1, wherein the processor includes:
a unit that prepares a communication queue that stores a communication entry, which is information used to identify the contents of the communication request to the BMC; and
a communication request storage unit that, after the processor suspends a process of the OS when the communication request occurs, stores in the communication queue the communication entry corresponding to the communication request, programs a regular interrupt into the BIOS in advance for a process of the stored communication entry.

3. The communication control device according to claim 2, wherein the processor further includes:

a regular interrupt unit that allows an interrupt to occur into the BIOS at intervals associated with the programming; and
a communication processing unit that checks the communication queue after the interrupt occurs and, when the communication entry is stored in the communication queue and when it is possible to communicate with the BMC, starts the communication with the BMC in response to the communication request as well as making the OS restart a process.

4. The communication control device according to claim 2, wherein,
the communication entry includes a communication request occurrence time and communication contents; and
the processor corrects the communication contents in accordance with the contents of the communication request occurrence time in the second process.

5. The communication control device according to claim 3, wherein the processor further includes:
the communication processing unit that, after the communication with the BMC starts in the communication processing unit, when the interrupt occurs again, checks the communication queue again and, when the check result shows that there is a communication entry for which the communication is already completed, deletes the communication entry.

6. A method of controlling communication between a BIOS (Basic Input/Output System) and a BMC (Baseboard Management Controller), comprising:
a step of, when a communication request for communication with the BMC occurs from the BIOS or an OS (Operating System), performing a process associated with the communication request by dividing it into a first process and a second process,
the first process being configured to store contents of the communication request and make the OS restart a process without performing the communication between the BIOS and the BMC in response to the communication request, and
the second process being configured to actually perform the communication between the BIOS and the BMC in response to the stored communication request without performing a waiting process,
wherein said second process is regularly performed at only certain intervals.

7. The method of controlling communication according to claim 6, further comprising:
a step of preparing a communication queue that stores a communication entry, which is information used to identify the contents of the communication request to the BMC; and
a communication request storage step of, after the processor suspends a process of the OS when the communication request occurs, storing in the communication queue the communication entry corresponding to the communication request, programming a regular interrupt into the BIOS in advance for a process of the stored communication entry.

8. The method of controlling communication according to claim 7, further comprising:
a regular interrupt step of allowing an interrupt to occur into the BIOS at intervals associated with the programming; and
a communication processing step of checking the communication queue after the interrupt occurs and, when the communication entry is stored in the communication queue and when it is possible to communicate with the BMC, starting the communication with the BMC in response to the communication request as well as making the OS restart a process.

9. The method of controlling communication according to claim 7, wherein,
when the communication request is a communication request from an ACPI tree and when the contents of the communication request do not allow a process to be completed before the communication with the BMC comes to an end, the ACPI tree waits with polling while calling a Sleep method between the first and second processes.

10. The method of controlling communication according to claim 7, wherein
the communication entry includes a communication request occurrence time and a communication contents, and further comprising:
correcting the communication contents in accordance with the contents of the communication request occurrence time in the second process.

11. The method of controlling communication according to claim 8, further comprising:
a step of, after the communication with the BMC starts at the communication processing step, when the interrupt occurs again, checking the communication queue again and,
a step of, when the check result shows that there is a communication entry for which the communication is already completed, deleting the communication entry.

12. A non-transitory computer-readable medium on which a communication control program for controlling communication between a BIOS (Basic Input/Output System) and a BMC (Baseboard Management Controller) is recorded, said program causing to function as a communication control device, said communication control device comprising:
a processor that performs a process of an OS (Operating System) and a process of the BIOS, and, when a communication request for communication with the BMC occurs from the BIOS or OS, performs a process associated with the communication request by dividing it into a first process and a second process,
the first process being configured to store contents of the communication request and make the OS restart a process without performing the communication between the BIOS and the BMC in response to the communication request, and
the second process being configured to actually perform the communication between the BIOS and the BMC in response to the stored communication request without performing a waiting process,
wherein said second process is regularly performed at only certain intervals.

* * * * *